United States Patent
Hidaka

(10) Patent No.: US 9,407,577 B2
(45) Date of Patent: Aug. 2, 2016

(54) COMMUNICATION CONTROL SYSTEM, SWITCH NODE AND COMMUNICATION CONTROL METHOD

(75) Inventor: Youichi Hidaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 390 days.

(21) Appl. No.: 14/006,651

(22) PCT Filed: Mar. 21, 2012

(86) PCT No.: PCT/JP2012/057176
§ 371 (c)(1),
(2), (4) Date: Sep. 20, 2013

(87) PCT Pub. No.: WO2012/128282
PCT Pub. Date: Sep. 27, 2012

(65) Prior Publication Data
US 2014/0016648 A1  Jan. 16, 2014

(30) Foreign Application Priority Data
Mar. 23, 2011 (JP) ................................. 2011-063441

(51) Int. Cl.
*H04L 12/933* (2013.01)
(52) U.S. Cl.
CPC ...................... *H04L 49/15* (2013.01)
(58) Field of Classification Search
CPC ....................................................... H04L 49/15
See application file for complete search history.

(56) References Cited

U.S. PATENT DOCUMENTS

| 2006/0242333 A1* | 10/2006 | Johnsen | G06F 13/4022 710/30 |
| 2006/0242352 A1* | 10/2006 | Torudbakken | G06F 13/4022 710/312 |
| 2006/0242354 A1* | 10/2006 | Johnsen | G06F 13/404 710/316 |
| 2006/0253619 A1* | 11/2006 | Torudbakken | G06F 13/4022 710/31 |

(Continued)

FOREIGN PATENT DOCUMENTS

| CN | 101242371 A | 8/2008 |
| CN | 101501660 A | 8/2009 |
| EP | 2 541 845 A1 | 1/2013 |
| JP | 2007-195166 A | 8/2007 |
| JP | WO 2010/110183 A1 | 9/2010 |
| JP | WO 2011/004548 A1 | 1/2011 |
| WO | WO 2011/020080 A1 | 2/2011 |

OTHER PUBLICATIONS

Extended European Search Report dated Nov. 11, 2014.

(Continued)

*Primary Examiner* — Ajay Cattungal
(74) *Attorney, Agent, or Firm* — McGinn IP Law Group PLLC

(57) ABSTRACT

In a switch node connected with an external control server, a high functional service protocol processing can be realized by utilizing a multi-route compatible switch and a network interface (NW I/F), which are prescribed by the PCI express. Specifically, in a system which is provided with a switch node and a control server, a plurality of CPUs having a great deal of memories and a plurality of extended NW I/Fs are connected by a multi-route compatible PCI express switch, to configure a switch port of the plurality of extended NW I/Fs. Load distribution transfer processing to the plurality of CPUs from the network interfaces is made possible. High-speed packet processing is realized through the multiple processing by using the plurality of CPUs. A high-speed switch node is provided in which a large-capacity flow table is configured with the software-based switch node by using a large-capacity memory space of the CPU.

18 Claims, 13 Drawing Sheets

(56) References Cited

U.S. PATENT DOCUMENTS

| | | | |
|---|---|---|---|
| 2007/0183393 A1 | 8/2007 | Boyd et al. | |
| 2010/0115174 A1* | 5/2010 | Akyol | G06F 13/385 710/316 |
| 2010/0180062 A1 | 7/2010 | Hidaka et al. | |
| 2010/0250823 A1 | 9/2010 | Suganuma | |
| 2011/0213902 A1* | 9/2011 | Hidaka | G06F 11/2043 710/33 |
| 2011/0286359 A1 | 11/2011 | Shimonishi | |
| 2011/0302390 A1 | 12/2011 | Copeland et al. | |

OTHER PUBLICATIONS

Guohan Lu, et al., "ServerSwitch: A Programmable and High Search Performance Platform for Data Center Networks", USENIX, Mar. 7, 2011, p. 1-14.

Sangjin Han, et al., "PacketShader: A GPU-Accelerated Software Router", Computer Search Communication Review, ACM, New York, US, vol. 41, No. 4, Aug. 30, 2010, p. 195-206, XP058004884.

International Search Report in PCT/JP2012/057176 dated Apr. 24, 2012 (English Translation Thereof).

"OpenFlow Switch Specification, Version 1.0.0", Dec. 31, 2009, the Internet (URL:http://www. openflowswitch.org/documents/openflow-spec-v1.0.0.pdf).

Yan Luo, et al., Accelerating OpenFlow Switching with network processors, ANCS' 09 Proceedings of the 5th ACM/IEEE Symposium on Architectures for Networking and Communications Systems, ACM Oct. 20, 2009, pp. 70-71.

English translation of PCT/ISA/237 (written opinion of the international searching authority, dated Apr. 24, 2012).

PCT/IB/373 dated Sep. 24, 2013.

Chinese Office Action dated May 27, 2015 with an English translation.

* cited by examiner

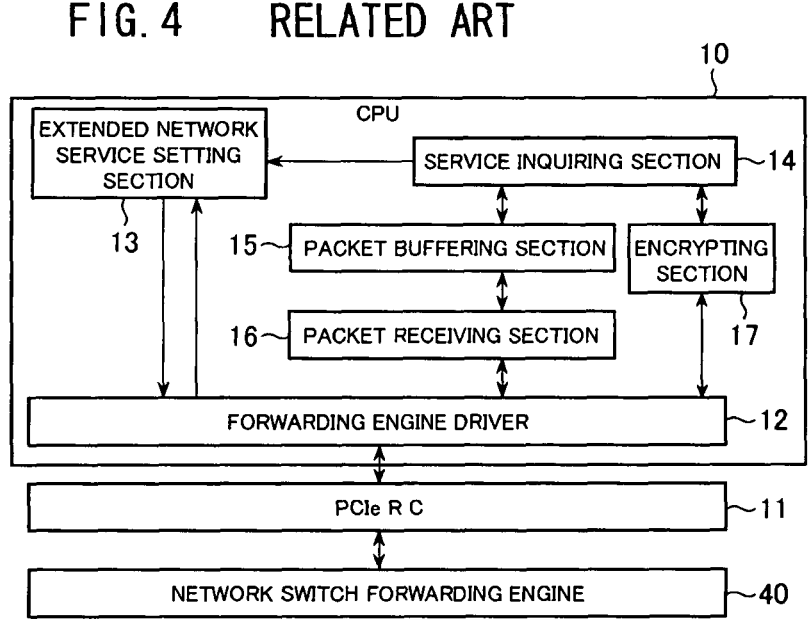

FIG. 13

```
                                    81:TRANSFER TABLE
              ┌─────────────────────────┐
    ENTRY 0   │  MAC DA=0, MAC SA=1     │
              ├─────────────────────────┤
    ENTRY 1   │  MAC DA=1, MAC SA=1     │
              ├─────────────────────────┤
    ENTRY 2   │  IP DA=2, MAC SA=1      │
              │          ⋮              │
              ├─────────────────────────┤
  ENTRY 64000 │  IP DA=64000, IP SA=1   │
              │          ⋮              │
              ├─────────────────────────┤
ENTRY 6400000 │  IP DA=6400000, IP SA=1 │
              └─────────────────────────┘
```

COMMUNICATION CONTROL SYSTEM, SWITCH NODE AND COMMUNICATION CONTROL METHOD

TECHNICAL FIELD

The present invention relates to a communication control system, and especially to a communication control system which controls a switch node.

BACKGROUND ART

A conventional network equipment is a black box and flexible control such as load distribution and bias processing cannot be carried out from outside. Therefore, when the scale of the network became large, there is a problem that the improvement and recognizing of conducts of a system become difficult and a design and change of the configuration requires a large cost.

As a technique of solving such a problem, a technique of separating a packet transfer function and a route control function in a network equipment is thought of. For example, the network equipment takes charge of the packet transfer function and a control unit outside the network equipment takes charge of the route control function. Thus, the control becomes easy and a flexible network can be built.

(Explanation of CD Separation Type Network)

As one of networks in which functions are separated, a CD (C: control plane/D: data plane) separation type network is proposed in which a node unit on the control plane side controls a node unit on the data plane side.

As an example of the CD separation type network, the open flow network using the open flow (OpenFlow) technique is known in which a controller controls switches to carry out route control of the network. The details of the open flow technique are described in Non-Patent Literature 1. It should be noted that the open flow network is an example only.

(Explanation of Open Flow Network)

In the open flow network, the operation of open flow switches (OFS) is controlled by operating flow tables related to the route control of open flow switches (OFS) which are equivalent to node units by an open flow controller (OFC) which is equivalent to a control unit.

Hereinafter, for simplification of description, the open flow controller (OFC) is referred to as a "controller" and the open flow switch (OFS) is referred to as a "switch".

The controller and the switch are connected by a control channel (control communication channel) called "secure channel", which is a channel protected by a dedicated line and SSL (Secure Socket Layer). The controller and the switch transmit and receive open flow messages (OpenFlow Messages) as control messages which conform to the open flow protocol through the control channel.

The switches in the open flow network are arranged in the open flow network and are edge switches and core switches which are under the control of the controller. A series of processing of a packet from reception of the packet in an input edge switch (ingress switch) in the open flow network to transmission from the output switch (egress switch) is called a flow. In the open flow network, a communication is recognized as a flow of end-to-end (E2E) and a route control, a fault recovery, a load distribution, and an optimization are carried out in a flow unit.

The packet can be read as a frame. A difference between the packet and the frame is a difference in the unit of data handled in a protocol (PDU: Protocol Data Unit) only. The packet is the PDU of "TCP/IP" (Transmission Control Protocol/Internet Protocol), and on the other hand, the frame is the PDU of "Ethernet" (registered trademark).

The flow table is a set of flow entries, each of which defines a condition (rule) to specify a packet to be processed as a flow, statistical data which shows the number of times the packet matches the rule, and a processing content (action) to be carried out to the packet.

The rule of the flow entry is defined based on various combinations of a part or all of data of protocol hierarchy layers which are contained in the header field of the packet and it is possible to identifiable. As an example of the data of each protocol hierarchy layers, a destination address, a source address, a destination port, a source port and so on are exemplified. It should be noted that it is supposed that the above-mentioned address contains MAC address (Media Access Control Address) and IP address (Internet Protocol Address). Also, in addition to the above data, data of entrance port (ingress Port) is usable for the rule of the flow entry. Also, a normal expression of a part (or all) of a value of the header field of the packets to be processed as the flow, an expression using wildcard "*" thereof, and so on can be set for the rule of the flow entry.

The action of the flow entry shows an operation such as an operation of "outputting at the specific port", an operation of "discarding", and an operation of "rewriting a header". For example, if identification data of the output port (such as output port number and so on) is shown in the action of the flow entry, the switch outputs the packet to the port corresponding to this. If the identification data of the output port is not shown, the switch discards the packet. Or, if header data is shown in the action of the flow entry, the switch rewrites the header of the packet based on the header data.

The switch executes the action of the flow entry to a group of packets (a series of packets) matching the rule of the flow entry. Specifically, when receiving the packet, the switch searches the flow entry which has the rule matching the header data of the received packet from the flow table. When the flow entry which has the rule matching the header data of the received packet is found out as a result of the search, the switch carries out an operation of updating statistical data of the flow entry and an operation specified as the action of the flow entry to the received packet. On the other hand, when the flow entry which has the rule matching the header data of the reception packet is not found as a result of the search, the switch determines that the received packet is a first packet. The switch transfers the received packet (or a copy) to the controller in the open flow network through the control channel. Also, the switch requests route calculation for the packet based on a source address, a destination address and so on of the received packet. The switch receives a flow entry setting message as a response and updates the flow table.

It should be noted that the default entry which has the rule matching the header data of all packets at a low priority is registered on the flow table. When the flow entry matching the received packet is not found, the reception packet matches this default entry. The action of the default entry is "the transmission of the inquiry data of the received packet to the controller".

(Explanation of PCI Express)

Also, in recent years, an interface (I/F) of "PCI express (PCIe)" is widely used instead of a PCI bus (Peripheral Component Interconnect bus). The PCI bus is of a parallel transmission type and the PCI express (PCIe) is of a serial transmission type. Although there is not a physical compatibility between the PCI bus and the PCI express (PCIe), the communications protocol and so on is common to them. In a transmission route (lane) of the minimum configuration which is used in the PCI express (PCIe), the duplex transmission of 2.5 Gbps (Gigabit per second) in mono-directional communication and 5.0 Gbps in bi-directional communication is possible.

(Explanation of Conventional Network System)

FIG. 1, FIG. 2, FIG. 3, FIG. 4, and FIG. 5 show a configuration of a conventional network system. Specifically, the system configuration is a configuration in which hardware-based switch processing is carried out and and an extended network service is executed by the control server.

(Conventional Network System Configuration)

FIG. 1 shows a basic configuration of a conventional network system. The conventional network system contains a switch node 1, terminals 2 (2-i, i=1 to T: T is the number of terminals) and a control server 3.

The switch node 1 is equivalent to a switch in the open flow network. The control server 3 is equivalent to a controller in the open flow network. The terminal 2 (2-i, i=1 to T) and the control server 3 are connected with the switch node 1.

The switch node 1 is provided with a CPU (Central Processing Unit) 10, a memory 20, a transfer table 30 and a network switch forwarding engine 40.

The CPU 10 is connected with the memory 20. Also, the CPU 10 and the transfer table 30 are connected with the network switch forwarding engine 40.

In the conventional network system, the network switch forwarding engine 40 which carries out the hardware-based packet processing exists on the switch node 1. The forwarding engine 40 receives packets which is outputted from the terminal 2 (2-i, i=1 to T), manages a destination of s flow by using the transfer table 30, carries out table search in case of the packet reception, and carries out packet switch processing among the terminals. Because the transfer table 30 is possible to carry out high-speed processing to withstand the switch processing among the terminals, but the memory 20 capacity is limited, the transfer table 30 which manages a great deal of flows cannot be configured.

(Internal Configuration of Network Switch Forwarding Engine)

FIG. 2 shows the internal configuration of the network switch forwarding engine 40.

The network switch forwarding engine 40 is provided with a PCI express endpoint (PCIe EP) 41, LAN (Local Area Network) interfaces (1G MAC) 42, a switch transfer processing section 43, a table search result register 44, a CPU destined packet queue 45, a CPU transmission packet queue 46, a switch fabric sharing packet buffer 47 and a DMA (Direct Memory Access) controller 48.

The PCI express endpoint (PCIe EP) 41 is connected with the CPU 10, the CPU destined packet queue 45 and the CPU transmission packet queue 46.

The LAN interfaces (1G MAC) 42 are connected with the terminals 2 (2-i, i=1 to T) and the control server 3.

The switch transfer processing section 43 is connected with the transfer table 30, the LAN interfaces (1G MAC) 42, the table search result register 44, the CPU transmission packet queue 46, and the switch fabric sharing packet buffer 47.

The switch transfer processing section 43 is provided with a table searching section 431, a packet analyzing section 432 and a switching section 433.

The table searching section 431 searches the transfer table 30 based on a search key.

The packet analyzing section 432 extracts the header section of the packet, generates the search key by using optional data in the header section, and notifies the search key to the table searching section 431.

The switching section 433 transfers the packet according to the action of the entry of the transfer table 30 matching the search key.

The table search result register 44 is connected with the CPU destined packet queue 45.

The table searching section 431 in the switch transfer processing section 43 transmits a search request (search key) to the transfer table 30 to carry out table search. The memory 20 is used as a storage location of the transfer table 30 according to the processing capability of the switch transfer processing section 43. Because a high-speed processing is requested, the capacity of the memory 20 decreases in inverse proportion to the processing capability and and the number of transfer tables which can be managed is limited.

(Configuration of Transfer Table)

FIG. 3 shows the configuration of the transfer table 30.

The transfer table 30 is equivalent to the flow table in the open flow network. The transfer table 30 can manage 64000 entries.

It should be noted that "MAC DA" shows a destination MAC address, "MAC SA" shows a source MAC address, "IP DA" shows a destination IP address, and "IP SA" shows a source IP address.

(Configuration of CPU)

FIG. 4 shows a configuration diagram of software which is executed in the CPU 10.

The CPU 10 is provided with a PCI express root complex (PCIe RC) 11, a forwarding engine driver 12, an extended network service setting section 13, a service inquiring section 14, a packet buffering section 15, a packet receiving section 16 and an encrypting section 17.

The forwarding engine driver 12, the extended network service setting section 13, the service inquiring section 14, the packet buffering section 15, the packet receiving section 16 and the encrypting section 17 are realized by the CPU 10 executing software.

The CPU 10 in the conventional network system is connected with the control server 3 and is used only to execute the extended network service.

(Configuration of Control Server)

FIG. 5 shows a configuration diagram of the control server 3.

The control server 3 is provided with a packet transmitting and receiving section 31, an encrypting section 32 and an extended network service processing section 33.

The control server 3 carries out the extended network service processing such as the destination determination to the inquiry packet, the change processing of the packet or the control of the switch node in response to a processing inquiry from the switch node 1. Also, the control server 3 carries out the transmission and reception of the packets by carrying out the encryption processing for the secure communication with the switch node 1.

As mentioned above, because the hardware-based switch node carrying out the packet processing by using the memory 20 which retains one high-speed transfer table, the memory 20 capacity of the transfer table is limited so that it is difficult to configure a large-capacity transfer table.

Also, because the hardware-based forwarding engine is provided with an exclusive-use LSI (Large Scale Integration), there is a demerit that the degree of general purpose is low, the cost becomes high, and there is no degree of freedom of change of a processing method.

It should be noted that as the techniques related to the present invention, a technique is disclosed in Patent Literature 1 (JP 2007-195166A) in which a method of generating and managing a routing table of the PCI bus address base by a built-in DID, a computer program and an apparatus.

In this related technique, a distribution computing system which includes a plurality of root nodes, a PCI adapter and one or more PCI switches, one of which includes a PCI configuration manager (PCM), routes a PCI transaction packet between a host and the adapter through the switch.

At this time, when a table is generated in one specified switch and a specific host is connected with the specified switch, a destination identifier which has a bit set specified by operating the PCM is supplied to the table. The destination identifier is added as an address to the PCI packet sent out from the specific host to one of the adapters through the specified switch. The PCI packet sent out through the specified switch from one of the adapters by using the destination identifier is determined to be for the specific host.

CITATION LIST

[Patent Literature 1] JP 2007-195166A
[Non-Patent Literature 1] "OpenFlow Switch Specification, Version 1.0.0", Dec. 31, 2009, the Internet (URL: http://www.openflowswitch.org/documents/openflow-spec-v1.0.0.pdf)

SUMMARY OF THE INVENTION

In a conventional switch node configuration, there is a limitation in the capacity of the transfer table connected with the hardware-based forwarding engine and it is difficult to configure the switch node which has a great deal of transfer tables. On the other hand, when the software-based switch node is configured, there is a problem with low transfer processing ability in the switch node, because the CPU is one.

An object of the present invention is provide to a communication control system in which a large-capacity flow table is configured in a software-based switch node, high-speed packet switch processing is carried out, and an external control server is connected to realize a high function service protocol processing by utilizing a multi-route compatible switch and a network interface (NW I/F), which are prescribed by the PCI express (PCIe).

The communication control system according to the present invention includes a switch node, and a control server configured to set a flow entry defining a rule and an action to uniformly control the packet, to a flow table of the switch node. The switch node includes: a functional section which is configured to connect a plurality of processors having large-capacity memories and a plurality of extended network interfaces by a multi-route compatible PCI express switch, to configure a switch port composed of the plurality of extended network interfaces; a functional section which is configured to carry out a load distribution transfer processing from the plurality of extended network interfaces to the plurality of processors and to carry out high-speed packet processing through multiple processing by using the plurality of processors; and a functional section which configures a large-capacity flow table in the software-based switch node by using a large-capacity memory space of the plurality of processors.

The switch node according to the present invention includes a plurality of extended network interfaces configured to receive packets; a plurality of processors having large-capacity memories; and a multi-route compatible PCI express switch configured to connect the plurality of processors and the plurality of extended network interfaces. Each of the plurality of extended network interfaces includes: a LAN interface configured to carry out an input and output of the packets; a packet transferring section configured to carry out at least one transfer processing of transfer processing of the packets to the plurality of processors, transfer processing of the packet between the plurality of processors, and transfer processing to a control server; a plurality of PF resources configured to carry out transmission and reception of the packets at high speed with the plurality of processors and the DMA transfer; and a PCI express endpoint configured to connect with the PCI express switch.

The communication control method according to the present invention is executed in a switch node which carries out processing of a received packet based on a flow entry which defines a rule and an action to uniformly control packets as a flow and which is set in its own flow table from a control server. The communication control method includes: connecting a plurality of processors having large-capacity memories and a plurality of extended network interfaces by a multi-route compatible PCI express switch to configure a switch port composed of the plurality of extended network interfaces; carrying out load distribution transfer processing to the plurality of processors from the plurality of extended network interfaces, and carrying out high-speed packet processing through multiple processing by using the plurality of processors; and configuring a large-capacity flow table in the switch node which is software-based, by using large-capacity memory spaces of the plurality of processors.

A program according to the present invention is executed by a switch node in which a plurality of extended network interfaces which receive packets and a plurality of processors having large-capacity memories are connected through a multi-route compatible PCI express switch, and which carries out processing of a received packet based on a flow entry which defines a rule and an action to uniformly control packets as a flow and which is set in its own flow table from a control server. The program includes: extracting a header section of one of the packets when any of the plurality of extended network interfaces receives the packets from a terminal; carrying out hash processing in a flow unit by using at least one of a MAC address, a VLAN address, and an IP address, of data of the extracted header section; determines one of the processors as a distribution destination through the hash processing; transmitting the packets to a packet queue of a PF resource corresponding to the distribution destination processor; and carrying out DMA transfer of the packets to the distribution destination processor based on a control of the distribution destination processor.

The program according to the present invention is a program to make a switch node execute processing of the above-mentioned communication control method. It should be noted that the program according to present invention can be stored in a storage unit and a storage medium.

Thus, the software-based switch node that it is possible to carry out high-speed switch processing in correspondence to a large-capacity transfer table, can be realized.

BRIEF DESCRIPTION OF THE DRAWINGS

FIG. 3 is a diagram showing a configuration example of a transfer table in the conventional network system;

FIG. 4 is a diagram showing a configuration example of a CPU in the conventional network system;

FIG. 13 is a diagram showing a configuration example of a transfer table in the communication control system according to the present invention;

DESCRIPTION OF EXEMPLARY EMBODIMENTS

<Overview of the Present Invention>

Figure 1:
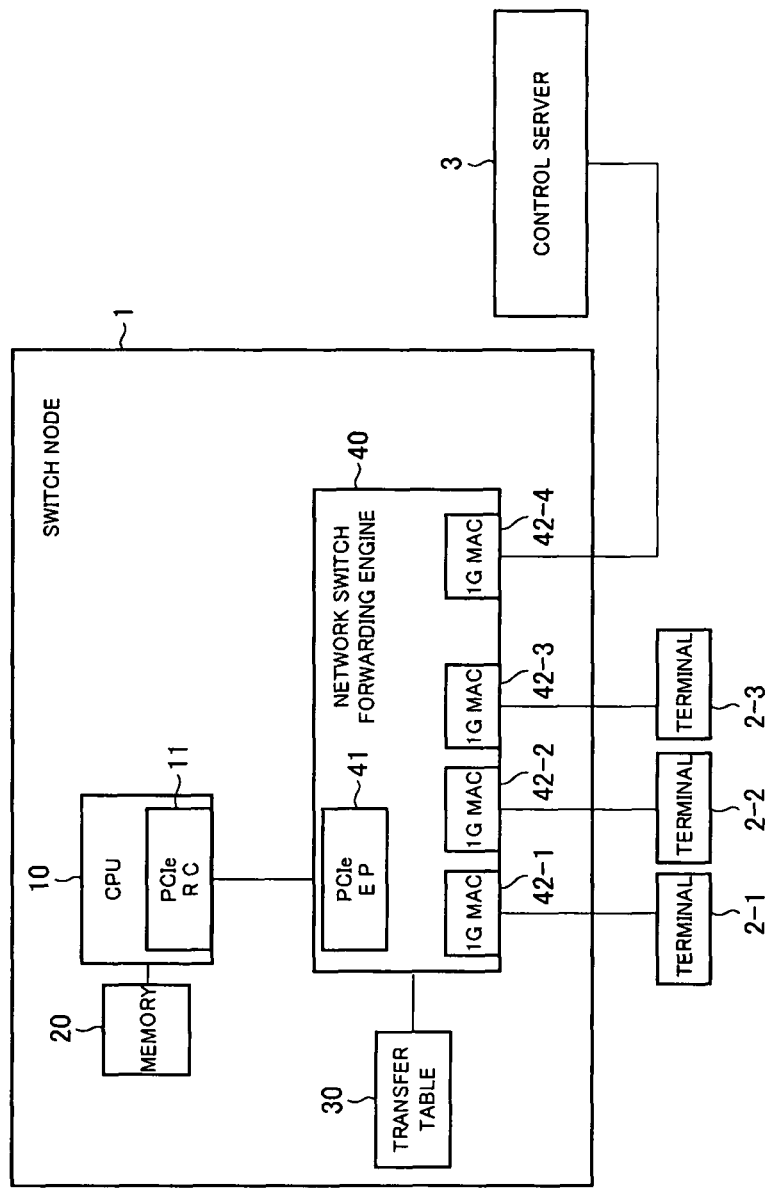
FIG. 1 is a diagram showing a basic configuration example of a conventional network system.
Figure 2:
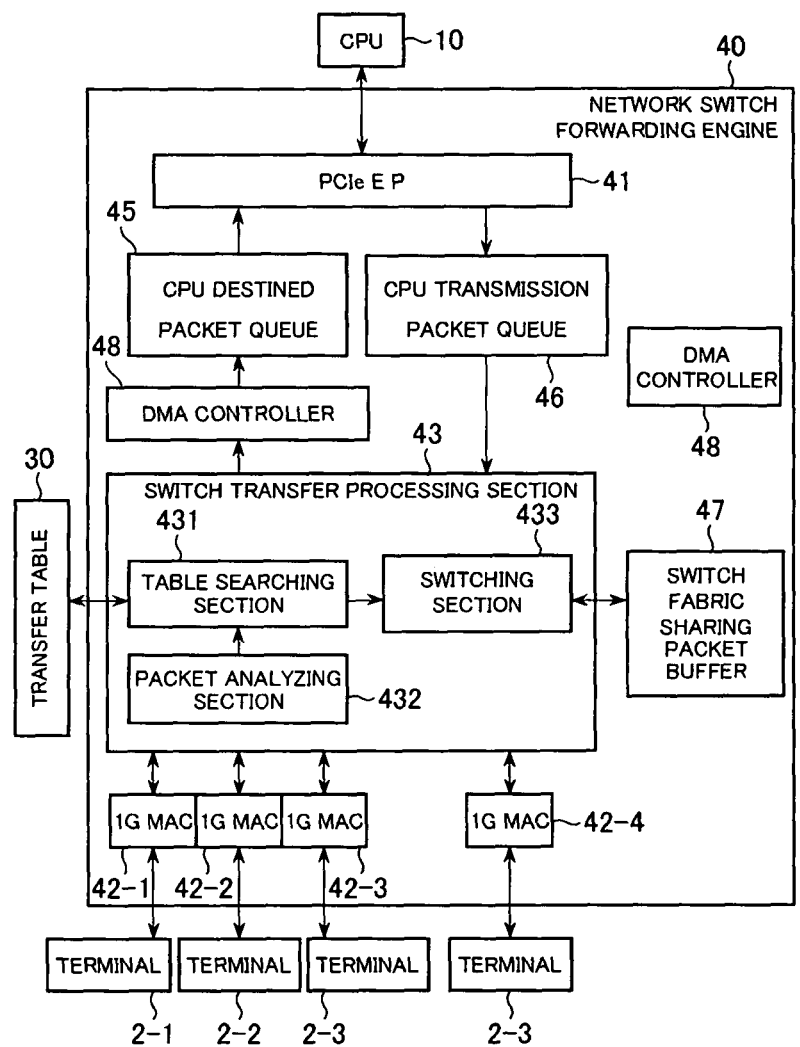
FIG. 2 is a diagram showing an internal configuration of a network switch forwarding engine of the conventional network system.

In a multi-route PCI express (PCIe: PCI Express) switch which is prescribed in "PCI-SIG" (PCI Special Interest Group), a plurality of CPUs to carry out high-speed packet processing and a plurality of extended network interfaces (NW I/Fs: Network Interfaces) are connected to each other to input and output packets, to configure a switch node which carries out the software-based packet processing.

In order to carry out the high speed processing of the packets supplied from a terminal, the extended network interface (extended NW I/F) has a function to transmit the packets to the plurality of CPUs which are connected to the next to the multi-route PCI express (PCIe) switch, and analyzes the header of each of the packets to determine one of the CPUs which processes the packets and distributes packets to the plurality of CPUs.

As for the data transfer between the plurality of CPUs and the plurality of extended network interfaces (extended NW I/Fs), the extended network interfaces (extended NW I/Fs) are provided with a plurality of DMA controllers to carry out DMA transfers to the plurality of CPUs at high speed. Thus, the extended network interface (extended NW I/F) carries out the data transfer to the plurality of CPUs by using the DMA controllers without imposing a load on each CPU.

Each CPU is connected with a large-capacity memory and configures a transfer table having a great deal of entries on the memory to determine destinations of packets.

When receiving the packets supplied from the extended network interface (extended NW I/F), the CPU analyzes a frame of each packet through software processing on the CPU, searches the transfer table on the memory, and determines processing to the packet (output port of the packet, the packet header rewrite processing and so on).

The CPU carries out the determined software-based processing after the processing to the packet is determined, and transmits the packets to the extended network interface (extended NW I/F).

When the processing to the packet is not determined as a result of the search of the transfer table, the CPU issues an inquiry of the processing of the packet to the control server which is connected with a back portion of the extended network interface (extended NW I/F).

The CPU receives the processing content of the packet from the control server and registers it in the transfer table as the entry.

Also, the CPU registers the entry in the transfer table which is managed by another CPU. Thus, when synchronization processing is carried out, the occurrence of a problem is prevented even if the packets are distributed to some CPUs from the extended network interface (extended NW I/F).

EXEMPLARY EMBODIMENTS

Below, exemplary embodiments of the present invention will be described with reference to the attached drawings.

The present invention deals with a CD separation type network. Here, the open flow network as one of the CD separation type networks will be described as an example. However, actually, the present invention is not limited to the open flow network.

(Configuration of Communication Control System)

Figure 6:
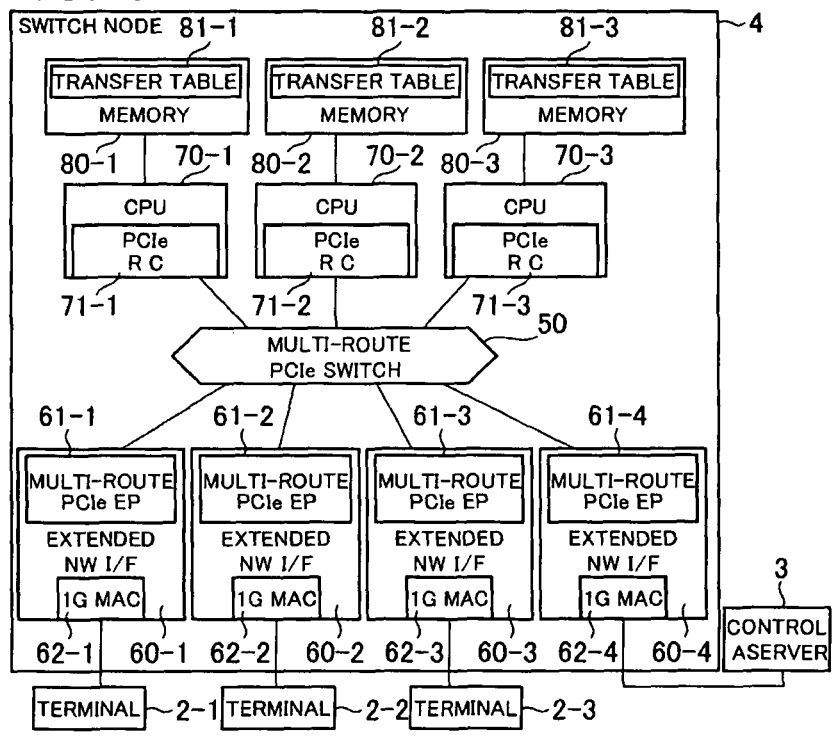
FIG. 6 is a diagram showing a basic configuration example of a communication control system according to the present invention.

FIG. 6 shows a basic configuration of a communication control system according to the present invention. The communication control system according to the present invention contains terminals 2 (2-*i*, i=1 to T: T is the number of terminals), a control server 3 and a switch node 4.

The control server 3 is equivalent to a controller in the open flow network. The switch node 4 is equivalent to a switch in the open flow network. The terminals 2 (2-*i*, i=1 to T) and the control server 3 are connected with the switch node 4.

Figure 5:
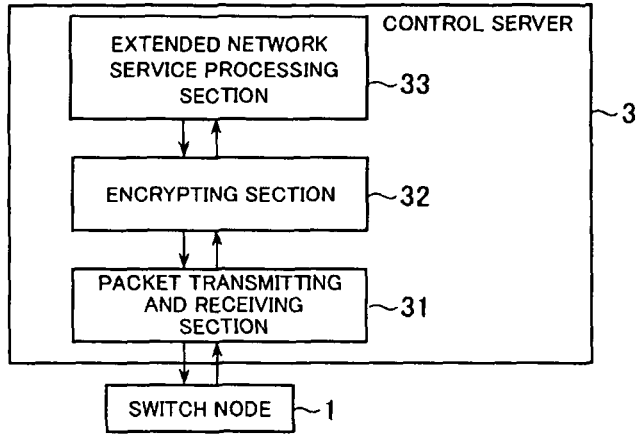
FIG. 5 is a diagram showing a configuration example of a control server in the conventional network system.

The control server 3 carries out the control of the transfer of the packets supplied from the network on the optimal route and the cooperation with the control server 3 to the switch node 4, so as to improve a network service. It should be noted that the control server 3 is same as in the conventional network system. That is, the control server 3 is as shown in FIG. 5.

The switch node 4 is provided with a multi-route PCI express (PCIe) switch 50, the extended network interfaces (extended NW I/Fs) 60 (60-*x*, x=1 to M: M is optional), the CPUs 70 (70-*y*, y=1 to N: N is optional), and memories 80 (80-*y*, y=1 to N).

The multi-route PCI express (PCIe) switch 50 is connected with the extended network interfaces (extended NW I/Fs) 60 (60-*x*, x=1 to M) and the CPUs (70-*y*, y=1 to N).

The multi-route PCI express (PCIe) switch 50 is a PCI express (PCIe) switch for multi-route which forwards data between the plurality of extended network interfaces (extended NW I/F) 60 (60-*x*, x=1 to M) and the plurality of CPUs 70 (70-*y*, y=1 to N).

The extended network interfaces (extended NW I/Fs) 60 (60-*x*, x=1 to M) are connected with the terminals 2 (2-*i*, i=1 to T) and the control server 3.

In this case, the extended network interface (extended NW I/F) 60-1 is connected with the terminal 2-1. The extended network interface (extended NW I/F) 60-2 is connected with the terminal 2-2. The extended network interface (extended NW I/F) 60-3 is connected with the terminal 2-3. The extended network interface (extended NW I/F) 60-4 is connected with the control server 3.

The extended network interfaces (extended NW I/Fs) 60-1 to 60-3 receive the packets supplied from the terminals 2-1 to 2-3.

For example, when the packet is supplied to the LAN interface (1G MAC) from the terminal 2-1, the extended network interface (extended NW I/F) 60-1 determines which of the plurality of CPUs 70 (70-$y$, $y=1$ to N) the packets are distributed to, and carries out the transfer of the packets to the CPU 70 (70-$y$, $y=1$ to N) through the multi-route PCI express (PCIe) switch 50.

The CPUs 70 (70-$y$, $y=1$ to N) are connected with the memories 80 (80-$y$, $y=1$ to N). Also, the CPUs 70 (70-$y$, $y=1$ to N) and the transfer tables 81 (81-$y$, $y=1$ to N) are connected with the network switch forwarding engine 40.

The CPUs 70 (70-$y$, $y=1$ to N) and the memories 80 (80-$y$, $y=1$ to N) have one-to-one correspondence. That is, the CPU 70 (70-$y$, $y=1$ to N) and the memory 80 (80-$y$, $y=1$ to N) are present for the same number. However, actually, the plurality of CPUs 70 (70-$y$, $y=1$ to N) may share the same memory 80 (80-$y$, $y=1$ to N).

The CPU 70 (70-$y$, $y=1$ to N) carries out packet transfer processing.

The memory 80 (80-$y$, $y=1$ to N) is a large-capacity memory and stores the transfer table 81 (81-$z$, $z=1$ to N).

In this way, in the switch node 4, the multi-route PCI express (PCIe) switch 50 configures switch ports of the plurality of extended network interfaces (extended NW I/Fs) 60 (60-$x$, $x=1$ to M), by connecting the plurality of CPUs 70 (70-$y$, $y=1$ to N) which have the large-capacity memories 80 (80-$y$, $y=1$ to N) and the plurality of extended network interfaces (extended NW I/Fs) 60 (60-$x$, $x=1$ to M).

Also, by permitting load distribution transfer processing to the plurality of CPUs 70 (70-$y$, $y=1$ to N) possible from the plurality of extended network interfaces (extended NW I/Fs) 60 (60-$x$, $x=1$ to M), the high-speed packet processing through multi-processing using the plurality of CPUs 70 (70-$y$, $y=1$ to N) is realized, and the large-capacity flow table using the large-capacity memories of the CPUs is realized.

Thus, the switch node 4 is a software-based switch node, but can realize the high-speed switch node having a large-capacity flow table.

<Exemplification of Hardware>

An example of specific hardware to realize the communication control system according to the present invention will be described below.

As examples of the terminal 2 (2-$i$, $i=1$ to T) and the control server 3, computers such as a PC (personal computer), an appliance, a thin client terminal/server, a workstation, a mainframe, and a supercomputer are assumed. Also, as another example of the terminal 2 (2-$i$, $i=1$ to T), an IP telephone, a mobile phone, a smart phone, a smart book, a car navigation system, a carrying-type game machine, a home-use game machine, a carrying-type music player, a handy terminal, a gadget bag (electronic equipment), an Interactive TV, a digital tuner, a digital recorder, an information home appliance, an OA (Office Automation) equipment, a storefront terminal and a multi-function copy machine, a digital signage (electronic signboard) and so on are exemplified. It should be noted that the terminal 2 (2-$i$, $i=1$ to T) and the control server 3 may be a relay equipment and a peripheral device.

As an example of the switch node 4, a network switch, a router, a proxy, a gateway, a firewall, a load balancer (load distribution apparatus), a band control system (packet shaper), a security monitoring and controlling equipment (SCADA: Supervisory Control And Data Acquisition), a gatekeeper, a base station, an access point (AP), a communication satellite (CS), a computer having a plurality of communication ports and so on are exemplified.

The terminal 2 (2-$i$, $i=1$ to T), the control server 3, and the switch node 4 may be an extension board installed on a computer and a virtual machine (VM) built on a physical machine. Also, the terminal (2-$i$, $i=1$ to T), the control server 3, and the switch node 4 may be installed on moving bodies such as a vehicle, a ship, and an aircraft.

As an example of the extended network interface (extended NW I/F) 60 (60-$x$, $x=1$ to M), a semiconductor integrated circuit such as a printed circuit board (motherboard and I/O board) corresponding to the LAN and so on, a network adapter such as an NIC (Network Interface Card), the similar extension cards and so on are exemplified. In this case, it is supposed that the extended network interface (extended NW I/F) 60 (60-$x$, $x=1$ to M) in is loaded with a network processor to carry out processing at high speed in hardware.

The CPU 70 (70-Y, $Y=1$ to N) is an example of processor (processor) only. The CPU 70 (70-Y, $Y=1$ to N) may be a network processor (NP), a microprocessor (microprocessor), microcontroller, a semiconductor integrated circuit (LSI: Large Scale Integration) having an exclusive-use function and so on.

As an example of the memory 80 (80-$y$, $y=1$ to N), a semiconductor memory device such as RAM (Random Access memory), ROM (Read Only memory), EEPROM (Electrically Erasable and Programmable Read Only The memory) and flash memory, an auxiliary storage such as HDD (Hard Disk Drive) and SSD (Solid State Drive), a removable disc such as DVD (Digital Versatile Disk), storage media such as an SD memory card (Secure Digital memory card) and so on are exemplified.

However, actually, the present invention is not limited to these examples.

(Configuration of Extended Network Interface (Terminal Side))

Figure 7:
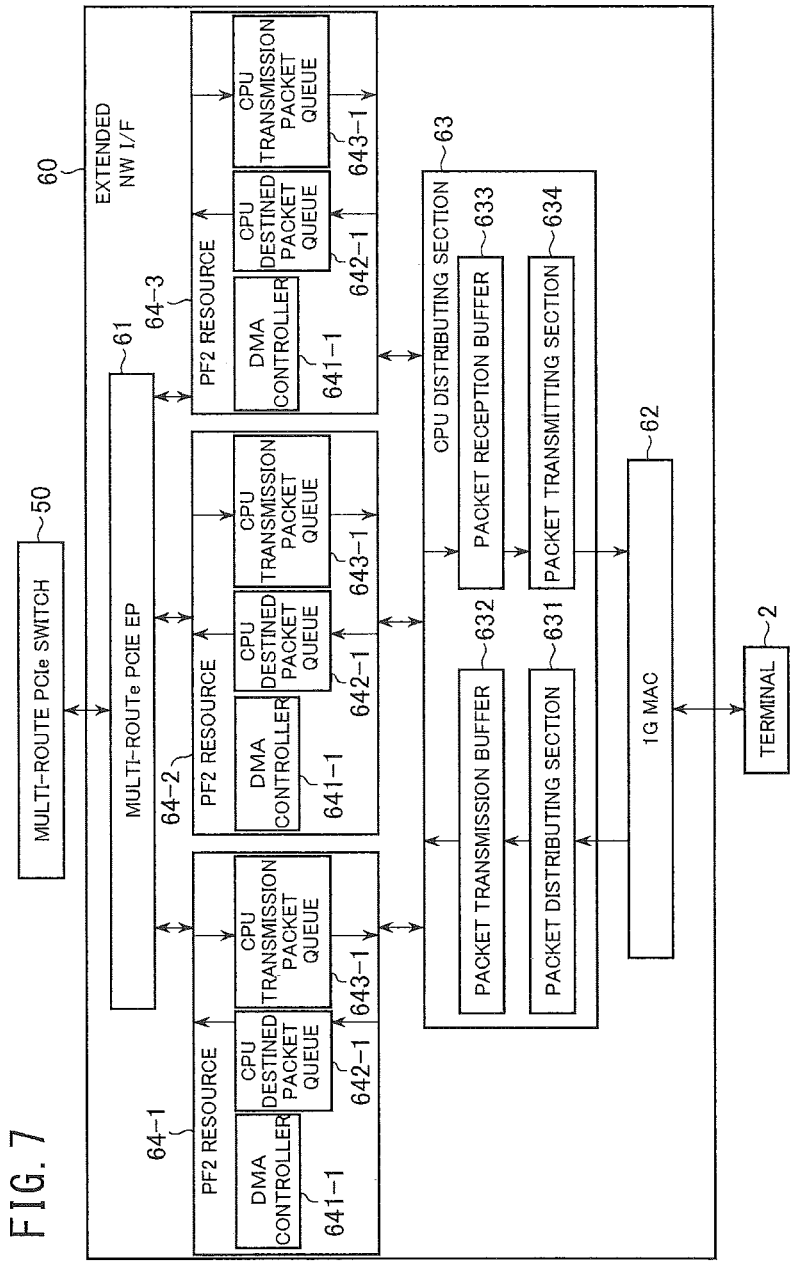
FIG. 7 is a diagram showing a configuration example of an extended network interface (extended NW I/F) on the side of a terminal.

FIG. 7 shows the configuration of the extended network interfaces (extended NW I/Fs) 60-1 to 60-3 which are connected with the terminals 2-1 to 2-3.

Each of the extended network interfaces (extended NW I/Fs) 60-1 to 60-3 is provided with a multi-route PCI express endpoint (PCIe EP) 61, a LAN interface (1G MAC) 62, a CPU distributing section 63 and PF resources 64 (64-$y$, $y=1$ to N).

The multi-route PCI express endpoint (PCIe EP) 61 is connected with the multi-route PCI express (PCIe) switch 50.

The LAN interface (1G MAC) 62 inputs and outputs packets from and to either of the terminals 2-1 to 2-3. The LAN interface (1G MAC) is a LAN interface which conforms to the data transfer of 1 Gbps. It should be noted that "1G" is only an example.

The CPU distributing section 63 carries out the distribution processing of the packets to the plurality of CPUs 70 (70-$y$, $y=1$ to N).

The PF resources 64 (64-$y$, $y=1$ to N) carry out the transmission and reception of control messages and the packets at high speed through the DMA transfer with the plurality of CPUs 70 (70-$y$, $y=1$ to N). In this case, a PF1 resource 64-1, a PF2 resource 64-2 and a PF3 resource 64-3 are shown as an example of PF resources 64 (64-$y$, $y=1$ to N).

(Configuration of CPU Distributing Section)

The CPU distributing section 63 is provided with a packet distributing section 631, a packet transmission buffer 632, a packet reception buffer 633 and a packet transmitting section 634.

The packet distributing section 631 extracts the header section of each of the packets and the data in the header section, and carries out hash processing in a flow unit by using a MAC address, a VLAN address, an IP address and so on of the data of the header section.

The packet transmission buffer 632 transmits the packet to either of the PF resources 64 (64-$y$, y=1 to N) that can transmit the packets the CPU 70 (70-$y$, y=1 to N) of the determined distribution destination, in order to transfer packets to the CPU (70-$y$, y=1 to N) of the distribution destination.

The packet reception buffer 633 receives the packets transmitted from the CPUs 70 (70-$y$, y=1 to N) through the PF resources 64 (64-$y$, y=1 to N) and transmits it to the packet transmitting section 634.

The packet transmitting section 634 transmits the packet received from the packet reception buffer 633 to the terminal 2 (2-$i$, i=1 to T).

(Configuration of PF Resource)

Each of the PF resources 64 (64-$y$, y=1 to N) is provided with a DMA controller 641, a CPU destined packet queue 642 and the CPU transmission packet queue 643.

The DMA controller 641 controls the DMA transfer between each of the PF resources 64 (64-$y$, y=1 to N) and one of the CPUs 70 (70-$y$, y=1 to N).

The CPU destined packet queue 642 retains the packets to be transmitted to the CPUs 70 (70-$y$, y=1 to N).

The CPU transmission packet queue 643 retains the packet transmitted from the CPU 70 (70-$y$, y=1 to N).

(Packet Transfer Processing with CPU)

Figure 8:
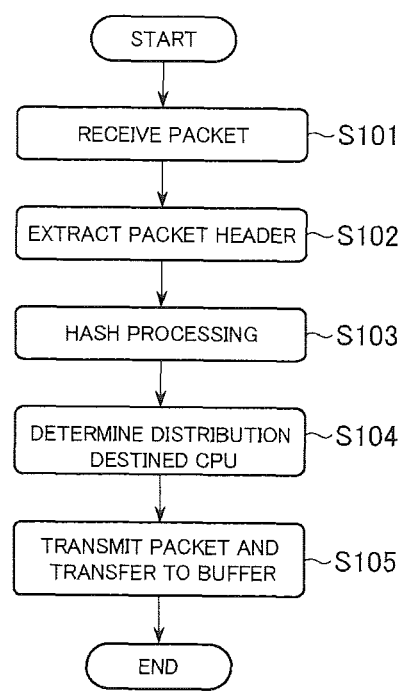
FIG. 8 is a flow chart showing an operation of packet transfer processing with the CPU.

FIG. 8 shows a flow chart to show an operation when a packet is transferred from the terminal 2 (2-$i$, i=1 to T) and then is processed in and transferred from the CPU 70 (70-$y$, y=1 to N).

(1) Step S101

When the packets are supplied to the extended network interfaces (extended NW I/Fs) 60 (60-$x$, x=1 to M) from the terminal 2 (2-$i$, i=1 to T), the LAN interface (1G MAC) 62 receives the packet and transfers the packet to the packet distributing section 631 of the CPU distributing section 63.

(2) Step S102

When receiving the packets, the packet distributing section 631 extracts the header section of each packet.

(3) Step S103

The packet distributing processing section 631 carries out hash processing in the flow unit by using a MAC address, a VLAN address, an IP address and so on and the data of the data of the extracted header section of the packet.

In this case, the packet distributing processing section 631 carries out hash processing to determine which of the plurality of CPUs 70 (70-$y$, y=1 to N) carries out the processing of the flow.

(4) Step S104

The packet distributing processing section 631 determines the CPU 70 (70-$y$, y=1 to N) as a distribution destination based on a result of the hash processing.

(5) Step S105

The packet distributing processing section 631 transmits the packets to the packet transmission buffer 632 in order to transfer the packet to the CPU 70 as the distribution destination.

The packet transmission buffer 632 transmits the packets to either of the CPU destined packet queues 642 of the PF resources 64 in order to transfer the packets to the CPU 70 determined as the distribution destination.

In this example, the packet transmission buffer 632 transmits the packet to the PF1 resource 64-1 to transfer to the CPU 70-1.

When the packets transmitted from the packet transmission buffer 632 are stored in the CPU destined packet queue 642-1 of the PF1 resource 64-1, the CPU 70-1 controls the DMA controller 641-1 of the PF1 resource 64-1 through the multi-route PCI express (PCIe) switch 50. The CPU 70-1 receives the packets accumulated in the CPU destined packet queue 642-1 at high speed without imposing a load on the CPU 70-1.

In this case, the CPU 70-1 controls the DMA controller 641-1 of the PF1 resource 64-1 through the PCI express root complex (PCIe RC) 71, the multi-route PCI express (PCIe) switch 50 and the PCI express (PCIe) bus provided with multi-route PCI express endpoint (PCIe EP) 61.

(Configuration of Extended Network Interface (Control Server Side))

Figure 9:
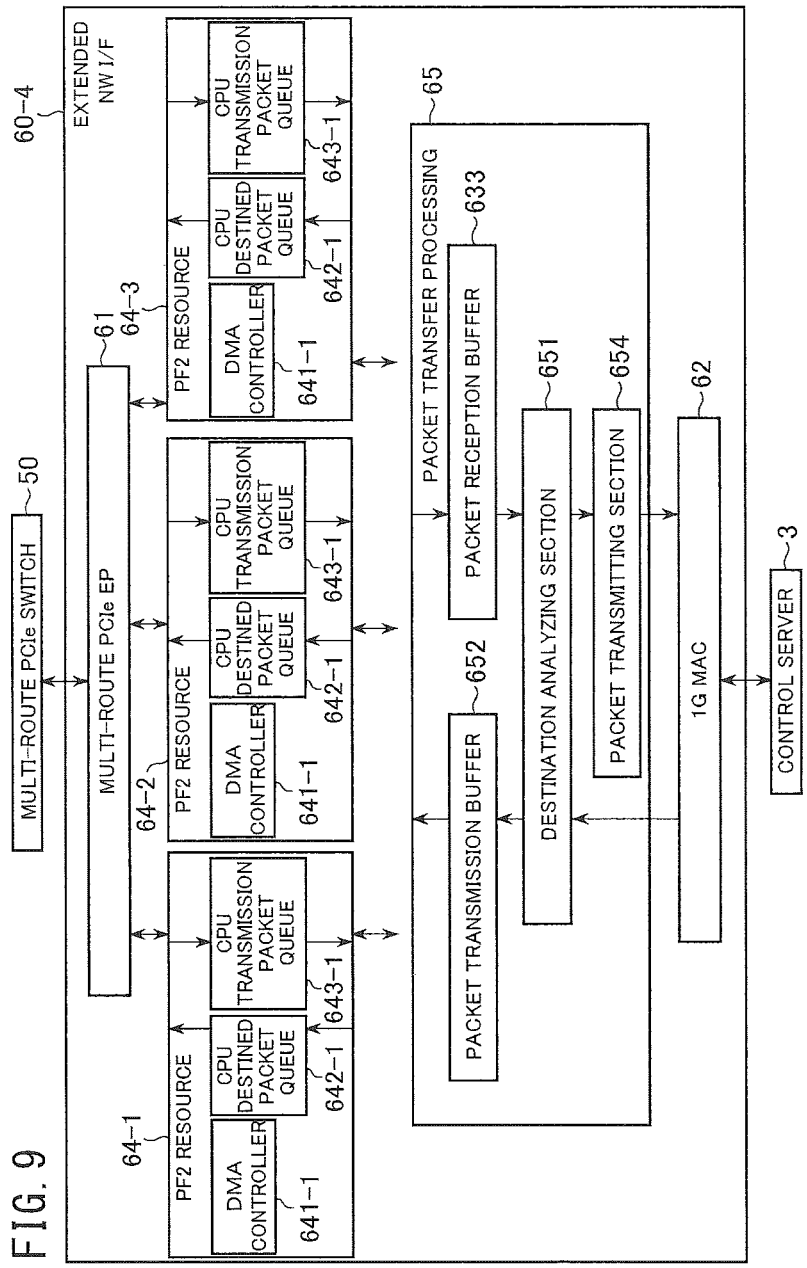
FIG. 9 is a diagram showing a configuration example of an extended network interface (extended NW I/F) on the side of a control server.

FIG. 9 shows the configuration of the extended network interface (extended NW I/F) 60-4 which is connected with the control server 3.

The extended network interface (extended NW I/F) 60-4 is provided with a multi-route PCI express endpoint (PCIe EP) 61, a LAN interface (1G MAC) 62, a PF (page file) resources 64 (64-$y$, y=1 to N) and the packet transfer processing section 65.

Each of the extended network interfaces (extended NW I/Fs) 60-1 to 60-3 is provided with the CPU distributing section 63, but the extended network interface (extended NW I/F) 60-4 is provided with the packet transfer processing section 65 instead of it. Actually, the extended network interface may include a section in which a function of the CPU distributing section 63 and a function of the packet transfer processing section 65 are integrated.

The multi-route PCI express endpoint (PCIe EP) 61 is connected with the multi-route PCI express (PCIe) switch 50.

The LAN interface (1G MAC) 62 inputs and outputs the packet from and to the control servers 3.

The PF resources 64 (64-$y$, y=1 to N) carry out the transmission and reception of control messages and packets at high speed through the DMA transfer with the plurality of CPUs 70 (70-$y$, y=1 to N). In this case, the PF1 resource 64-1, the PF2 resource 64-2 and the PF3 resource 64-3 are shown as an example of the PF resources 64 (64-$y$, y=1 to N).

The packet transfer processing section 65 carries out the transfer processing of the packets between each of the plurality of CPUs 70 (70-$y$, y=1 to N) and the control server 3.

(Configuration of Packet Transfer Processing Section)

The packet transfer processing section 65 is provided with a destination analyzing section 651, a packet transmission buffer 652, a packet reception buffer 653 and a packet transmitting section 654.

The destination analyzing section 651 extracts the header section of the packet, confirms a destination MAC address from data of the header section, and checks whether or not it is the MAC address used by the CPU 70 (70-$y$, y=1 to N) in the switch node 4. The destination analyzing section 651 changes the destinations of the packets according to the checking result.

The packet transmission buffer 652 transmits the packets to either of the PF resources 64 (64-$y$, y=1 to N) which can transfer the packets to the CPUs (70-$y$, y=1 to N) as the determined distributions in order to transfer the packets to the CPUs 70 (70-$y$, y=1 to N) as distribution destinations.

The packet reception buffer 653 receives the packets transmitted from the CPU 70 (70-$y$, y=1 to N) through the PF resource 64 (64-$y$, y=1 to N) and transmits them to the packet transmitting section 654.

The packet transmitting section 654 transmits the packets received from the packet reception buffer 653 to the terminal 2 (2-$i$, i=1 to T).

(Destination Analysis Processing)

Figure 10:
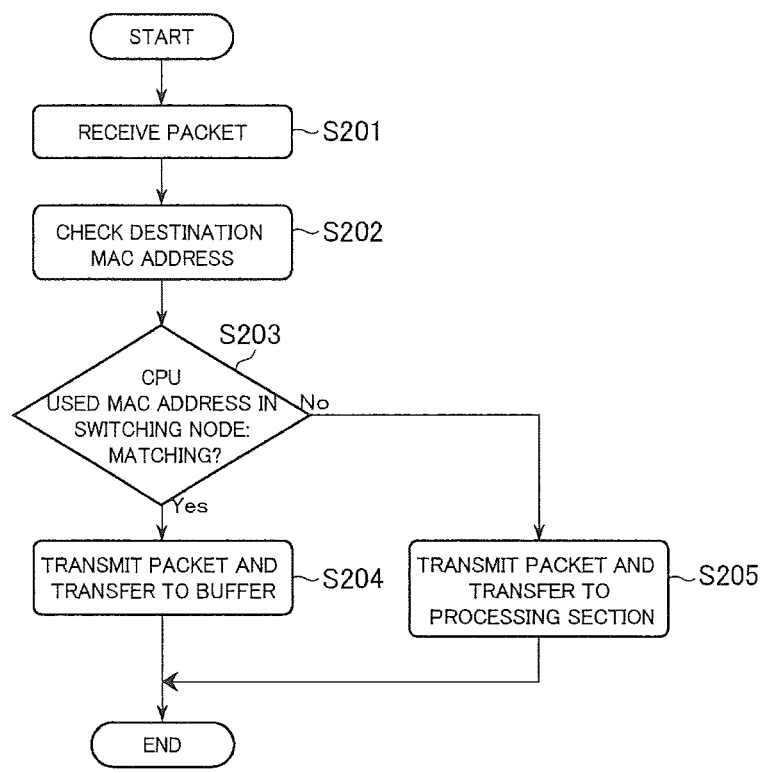
FIG. 10 is a flow chart showing an operation of destination analysis process.

FIG. 10 shows a flow chart showing the operation of the destination analysis processing.

(1) Step S201

When the packets are supplied to the extended network interface (extended NW I/F) 60 (60-x, x=1 to M) from the terminal 2 (2-i, i=1 to T), the LAN interface (1G MAC) 62 receives the packets and transfers the packets to the packet distributing section 631 of the packet distributing section 63.

(2) Step S202

When receiving the packets, the destination analyzing section 651 extracts the header section of each packet and checks the destination MAC address of the packet.

(3) Step S203

The destination analyzing section 651 checks whether or not the destination MAC address is a MAC address used by any of the CPUs 70 (70-y, y=1 to N) in the switch node 4.

(4) Step S204

The destination analyzing section 651 outputs the packets into the packet transmission buffer 652 by turning around without outputting the packets outside, when the destination MAC address is the MAC address used by the CPU 70 (70-y, y=1 to N).

(5) Step S205

The destination analyzing section 651 outputs the packets to the packet transmitting section 654 when the destination MAC address is not the MAC address used by any of the CPUs 70 (70-y, y=1 to N). The packet transmitting section 654 transmits the packet to the control server 3 through the LAN interface (1G MAC) 62-4.

(Relation Between Extended Network Interface and CPU)

The extended network interface (extended NW I/F) 60 (60-x, x=1 to M) is multi-route compatible, and when receiving the packets transmitted from the terminal 2 (2-i, i=1 to T), the extended network interface (extended NW I/F) 60 (60-x, x=1 to M) speeds up the processing through the load distribution processing of the software-based packet processing and the multiplexing of the packet processing in each of the CPUs 70 (70-y, y=1 to N).

The extended network interface (extended NW I/F) 60 (60-x, x=1 to M) determines the distribution processing of the packets to each of the CPUs 70 (70-y, y=1 to N) by using a hash function and so on.

The extended network interface (extended NW I/F) 60 (60-x, x=1 to M) distributes and transfers the packet to each of the CPUs 70 (70-y, y=1 to N) through the multi-route PCI express (PCIe) switch 50 at high speed to minimize the load of the CPU 70 (70-y, y=1 to N) by using the DMA controller 641.

Each of the CPUs 70 (70-y, y=1 to N) analyzes a received packet through software processing and searches a transfer table 81 (81-z, z=1 to N) which is stored in a large-capacity memory 80 (80-y, y=1 to N) provided for each CPU 70 (70-y, y=1 to N) to determines a conduct destination output port.

The transfer table 81 (81-z, z=1 to N) manages the destinations of a great deal of flows.

After determining the output port, each of the CPUs 70 (70-y, y=1 to N) controls the DMA controller 641 of the extended network interface (extended NW I/F) 60 (60-x, x=1 to M) as the output destination, and transfers the packet through the multi-route PCI express (PCIe) switch 50 at high speed to minimize the CPU load.

Also, each of the CPUs 70 (70-y, y=1 to N) transfers the packets to the control server 3 through the extended network interface (extended NW I/F) 60-4, when the output port is not determined as a result of the search of the transfer table 81 (81-z, z=1 to N), and issues an inquiry of the output destination.

Each of the CPUs 70 (70-y, y=1 to N) stores destination data of the flow in the transfer table 81 (81-z, z=1 to N) when the destination is determined as a result of the inquiry.

In this case, each of the CPUs 70 (70-y, y=1 to N) carries out synchronization processing such that the transfer tables 81 (81-z, z=1 to N) managed by the memories 80 (80-y, y=1 to N) have the same data, so that the load distribution of the search processing can be made.

Therefore, the software-based switch processing is not carried out by a single CPU having a limitation in processing capability unlike the conventional network system, and the hardware-based switch processing in which a capacity of the transfer table 81 (81-z, z=1 to N) is limited is not carried out. Thus, the software-based switch node 4 in which it is possible to carry out high-speed switching to the large-capacity transfer table 81 (81-z, z=1 to N) can be realized.

Also, the switch node 4 can be configured from a CPU, a memory, a PCI express (PCIe) switch, and a network interface, which have a generality so as to be used in a general computer, is cheap and highly efficient, and thus, there is a merit which is favorable in an aspect of the cost and in which has the high degrees of freedom of change because of the software base.

(Configuration of CPU)

Figure 11:
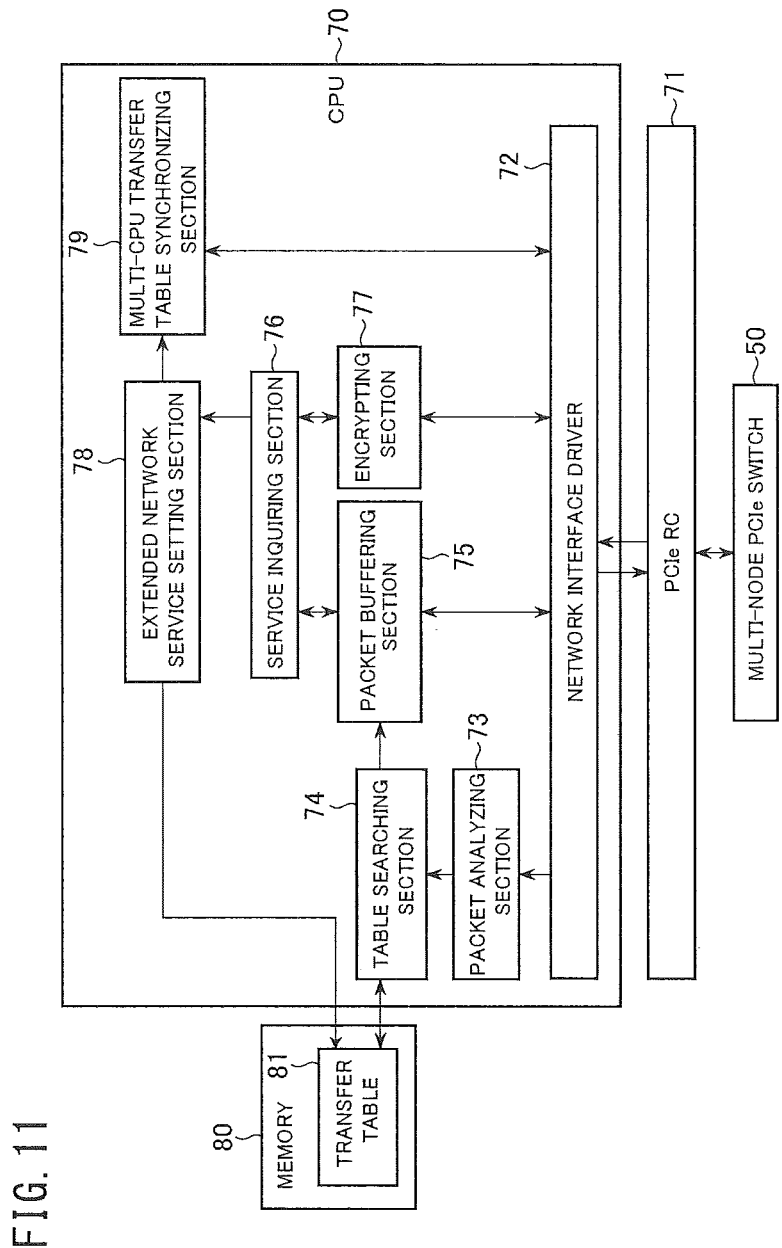
FIG. 11 is a diagram showing a configuration example of the CPU in the communication control system according to the present invention.

FIG. 11 is a diagram showing a software configuration which is executed by the CPU 70 (70-y, y=1 to N).

Each of the CPUs 70 (70-y, y=1 to N) is provided with a PCI express root complex (PCIe RC) 71, a network interface driver 72, a packet analyzing section 73, a table searching section 74 a packet buffering section 75, a service inquiring section 76, an encrypting section 77, an extended network service setting section 78 and a multi-CPU transfer table synchronizing section 79.

The PCI express root complex (PCIe RC) 71 is connected with the multi-route PCI express (PCIe) switch 50.

The network interface driver 72, the packet analyzing section 73, the table searching section 74, the packet buffering section 75, the service inquiring section 76, the encrypting section 77, the extended network service setting section 78 and the multi-CPU transfer table synchronizing section 79 are realized by each the CPUs 70 (70-y, y=1 to N) executing software.

The network interface driver 72 controls the extended network interfaces (extended NW I/Fs) 60 (60-x, x=1 to M).

The packet analyzing section 73 carries out the analysis of the packets supplied from the extended network interfaces (extended NW I/F) 60 (60-x, x=1 to M).

The table searching section 74 searches the transfer table 81 (81-z, z=1 to N) in order to determine a transferring method of the packet.

As for the switch processing and the packet whose processing is not yet determined, the packet buffering section 75 stores the packets until whether the processing of the packet should be inquired to the control server 3 is determined.

The service inquiring section 76 inquires the processing of the packet to the control server 3.

The encrypting section 77 carries out encrypted communication with the control server 3.

The extended network service setting section 78 sets the transfer table 81 (81-z, z=1 to N) according to an instruction from the control server 3 and carries out the processing of the extended network service.

The multi-CPU transfer table synchronizing section 79 transfers an instruction from the control server 3 to another CPU 70 (70-$y$, y=1 to N) and carries out the synchronization of the transfer table (81-$z$, z=1 to N).

(Multi-CPU Transfer Table Synchronization Processing)

Figure 12:
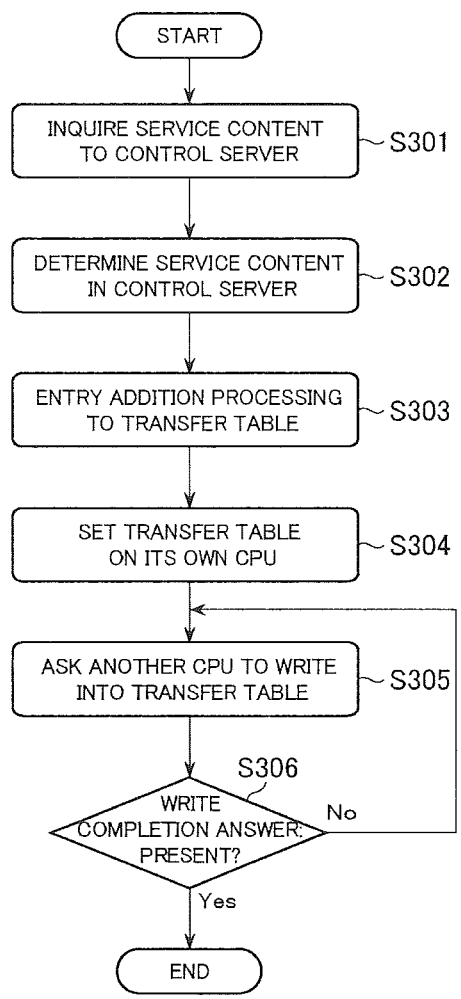
FIG. 12 is a flow chart showing an operation of synchronization processing of multi-CPU transfer tables.

FIG. 12 shows a flow chart showing the multi-CPU transfer table synchronization processing.

(1) Step S301

The service inquiring section 76 inquires a service processing method (processing content) to the control server 3. In this case, the service inquiring section 76 sends the packets related to the inquiry of the service processing method to the encrypting section 77. The encrypting section 77 encrypts the packets related to the inquiry of the service processing method to send to the network interface driver 72. The network interface driver 72 sends the encrypted packets to the multi-route PCI express (PCIe) switch 50 through the PCI express root complex (PCIe RC) 71. The multi-route PCI express (PCIe) switch 50 transmits the encrypted packets to the control server 3.

(2) Step S302

The control server 3 determines the service processing method. Here, the packet transmitting and receiving section 31 of the control server 3 receives the encrypted packets to send to the encrypting section 32. The encrypting section 32 decrypts the encrypted packets and sends the packets related to the inquiry of the service processing method to the extended network service processing section 33. The extended network service processing section 33 determines the service processing method based on the packets related to the inquiry of the service processing method.

(3) Step S303

The control server 3 carries out entry addition processing to the transfer table 81 (81-$z$, z=1 to N) according to the determined service processing method. In this case, the control server 3 transmits an entry addition request which is based on the service processing method to the service inquiring section 76, in a flow opposite to the flow direction at the abovementioned step S301. The service inquiring section 76 notifies the entry addition request to the extended network service setting section 78.

(4) Step S304

The extended network service setting section 78 sets the transfer table 81 (81-$z$, z=1 to N) on its own CPU according to the entry addition request. In this case, the extended network service setting section 78 sets the transfer table 81 (81-$z$, z=1 to N) stored in the large-capacity memory 80 (80-$y$, y=1 to N) which is provided for its own CPU, according to the entry addition request.

(5) Step S305

The extended network service setting section 78 notifies the contents of the transfer table 81 (81-$z$, z=1 to N) on its own CPU to the multi-CPU transfer table synchronizing section 79. The multi-CPU transfer table synchronizing section 79 asks the write of the transfer table to another CPU based on the transfer table setting on its own CPU. In this case, the extended network service setting section 78 notifies the contents of the transfer table 81 (81-$z$, z=1 to N) on its own CPU to the multi-CPU transfer table synchronizing section 79. In order to make the transfer table 81 (81-$z$, z=1 to N) on another CPU synchronize with the transfer table 81 (81-$z$, z=1 to N) on its own CPU, the multi-CPU transfer table synchronizing section 79 notifies all the entries of the transfer table 81 (81-$z$, z=1 to N) on its own CPU to the other CPU, and asks the write to the transfer table 81 (81-$z$, z=1 to N) on the other CPU.

(6) Step S306

The multi-CPU transfer table synchronizing section 79 waits until receiving a write completion response from the other CPU, and ends the processing if receiving the write completion response from the other CPU.

(Configuration of Transfer Table)

FIG. 13 shows the configuration of the transfer table 81 (81-$z$, z=1 to N).

The transfer table 81 (81-$z$, z=1 to N) can manage a great deal of flows. In this case, the transfer table 81 (81-$z$, z=1 to N) manages 6,400,000 entries.

It should be noted that "MAC DA" shows a destination MAC address, "MAC SA" shows a source MAC address, "IP DA" shows a destination IP address, and "IP SA" shows a source IP address.

(Software Packet Processing in CPU)

The operation of the software packet processing below in the CPU 70 (70-$y$, y=1 to N) will be described.

In the CPU 70 (70-$y$, y=1 to N), the network interface driver 72 which controls the extended network interface (extended NW I/F) 60 (60-$x$, x=1 to M) controls the DMA controller 641 through the PCI express root complex (PCIe RC) 71, and carries out the transmission and reception of the data between the CPU (70-$y$, y=1 to N) and the extended network interface (extended NW I/F) 60 (60-$x$, x=1 to M).

The network interface driver 72 receives the packet from the extended network interface (extended NW I/F) 60 (60-$x$, x=1 to M) through the PCI express root complex (PCIe RC) 71, and then transfers it to the packet analyzing section 73 for a switching operation.

The packet analyzing section 73 extracts the header data of the packet and so on, analyzes the extracted header data, generates a search key by using the header data, and hands it to the table searching section 74.

The table searching section 74 searches the transfer table 81 (81-$z$, z=1 to N) stored in the large-capacity memory 80 (80-$y$, y=1 to N) by using the search key to determine a processing method to the packet.

When there are any hit entry as the result of search of the transfer table 81 (81-$z$, z=1 to N), the table searching section 74 determines a destination output port of the packet and a processing method such as header rewrite processing based on the action of the entry.

After that, the table searching section 74 transfers the packet to the packet buffering section 75.

After that, when the processing method has been determined, the packet buffering section 75 carries out the processing of the packet, and carries out an operation of outputting the packet to the destination output port for the switching operation. The packet buffering section 75 transfers the packet to the network interface driver 72 to output the packet to the destination output port according to the determined processing method.

The network interface driver 72 controls the DMA controller 641 through the PCI express root complex (PCIe RC) 71, and outputs the packet to the CPU transmission packet queue 643 of the extended network interface (extended NW I/F) 60 (60-$x$, x=1 to M) as the destination output port.

Moreover, the network interface driver 72 controls the DMA controller 641 and stores the packet transmitted to the CPU transmission packet queue 643 in the packet reception buffer 633.

The packet transmitting section 634 reads the packet stored in the packet reception buffer 633 to transmit the terminal 2 (2-$i$, i=1 to T) of the output destination through the LAN interface (1G MAC) 62.

Also, when there is no hit entry as the result of search of the transfer table 81 (81-$z$, z=1 to N), the table searching section 74 inquires the processing method of the packet to the control server 3 and determines the processing method.

In such a case, the service inquiring section 76 encrypts the packet data by using the encrypting section 77 and then transfer to the network interface driver 72.

The network interface driver 72 controls the DMA controller 641 of the extended network interface (extended NW I/F) 60-4 through the PCI express root complex (PCIe RC) 71, and transmits the encrypted packet data to the CPU transmission packet queue 643 of the extended network interface (extended NW I/F) 60-4.

The network interface driver 72 controls the DMA controller 641 and transmits the packet transmitted to the CPU transmission packet queue 643 (encrypted packet data) to the packet reception buffer 653 of the packet transfer processing section 65.

After that, network interface driver 72 controls the DMA controller 641 and transmits the packet transmitted to the packet reception buffer 653 (encrypted packet data) to the destination analyzing section 651.

When receiving the packet (encrypted packet data), the destination analyzing section 651 confirms the destination MAC address of the packet and checks whether or not it is the MAC address used by the CPU (70-$y$, $y=1$ to N) in the switch node 4.

When it is the MAC address used by the CPU 70 (70-$y$, $y=1$ to N), the destination analyzing section 651 turns around the packet without outputting the packet outside and outputs the packet (encrypted packet data) to the packet transmission buffer 652.

When it is different from the used MAC address like the packet destined to the control server 3, the destination analyzing section 651 sends to the packet transmitting section 654, and transmits the packet (encrypted packet data) to the control server 3 through the LAN interface (1G MAC) 62-4.

The packet transmitting and receiving section 31 of the control server 3 receives the transmitted packet (encrypted packet data) and then transfers it to the encrypting section 32.

The encrypting section 32 decrypts the encrypted packet data, transmits the packet data to the extended network service processing section 33, and determines a processing method to the packet.

After the processing method is determined, the encrypting section 32 encrypts a packet of data of the processing method, and sends to the packet transmitting and receiving section 31. The packet transmitting and receiving section 31 transmits the packet to the extended network interface (extended NW I/F) 60-4 and replies the encrypted packet to the switch node 4.

The LAN interface (1G MAC) 62-4 of the extended network interface (extended NW I/F) 60-4 in the switch node 4 receives a response packet and stores the response packet in the packet transmission buffer 652.

The network interface driver 72 of the CPU 70 (70-$y$, $y=1$ to N) in the switch node 4 controls the DMA controller 641, and receives and sends the response packet stored in the packet transmission buffer 652 to the encrypting section 77. The encrypting section 77 decrypts and transmits the response packet to the service inquiring section 76.

When the processing method is determined based on the response packet from the control server 3, the service inquiring section 76 notifies processing contents to the extended network service setting section 78.

The extended network service setting section 78 carries out the packet header rewrite processing, transmits the packet to the instructed packet output port and carries out the packet switching operation.

Also, the extended network service setting section 78 writes the packet processing method obtained from the control server 3 in the transfer table 81 (81-$z$, $z=1$ to N) of the memory 80 provided in its own CPU such that it be possible to determine the processing method in the transfer table 81 (81-$z$, $z=1$ to N) from the next packet.

Also, the extended network service setting section 78 requests synchronization processing to the multi-CPU transfer table synchronizing section 79 such that the similar processing can be carried out in the plurality of CPUs 70 (70-$y$, $y=1$ to N).

The multi-CPU transfer table synchronizing section 79 updates the data of the transfer table 81 (81-$z$, $z=1$ to N) on another CPU 70 (70-$y$, $y=1$ to N) based on the data of the transfer table 81 (81-$z$, $z=1$ to N) on its own CPU 70 (70-$y$, $y=1$ to N) according to the request of the synchronization processing and carries out the synchronization processing of the transfer tables 81 (81-$z$, $z=1$ to N) on the plurality of CPUs.

(Features in this Exemplary Embodiment)

As described above, by using the multi-route PCI express (PCIe) switch, the distribution processing of the packets to each CPU can be carried out.

Also, the software-based high-speed switch operation processing using the plurality of CPUs can be realized by using the extended network interface (extended NW I/F).

Also, because the large-capacity memory can be installed, the CPU can build a large-capacity transfer table and the high-speed software-based switch node configuration which can manage a great deal of flows.

In the present invention, the plurality of CPUs 70 (70-$y$, $y=1$ to N) which are prescribed in "PCI-SIG", a plurality of I/O (Input/Output) units, and the standard multi-route compatible PCI express (PCIe) switch connectable with them are used.

Also, in the present invention, the packet is analyzed with the network processor and the extended network interface (extended NW I/F) card corresponding to the multi-route which can distribute the processing into the CPUs are used.

Also, in the present invention, a general-purpose CPU and memory are used to carry out the packet processing.

In the present invention, by carrying out the synchronization of the transfer table among the CPUs and the packet processing by the plurality of CPUs, the high-speed packet processing can be realized regardless of the software-base system.

Also, in the present invention, the high-speed transmission and reception of the packet is carried out between the extended network interface (extended NW I/F) and the CPU and the plurality of CPUs, by using the DMA controller by the PCI express (PCIe) switch.

Thus, the high-speed software-based switch node having a large-capacity transfer table can be configured.

Also, because hardware parts which configures the switch node are standard parts, the apparatus cost can be reduced, and the switch node can realized to have scalability in the performance by increasing the number of CPUs, and to have high flexibility by configuring the software-based system.

The present invention can be applied to a network apparatus which needs to manage a great deal of flows such as 10,000,000 flows, a network apparatus which needs the high-speed and complicated packet processing, and the high functional network apparatus which uses a lot of servers.

The present invention can be applied to the configuration in which an external control server is not used, so that the highly function switch node can be realized.

[First Exemplary Embodiment]

Figure 14:
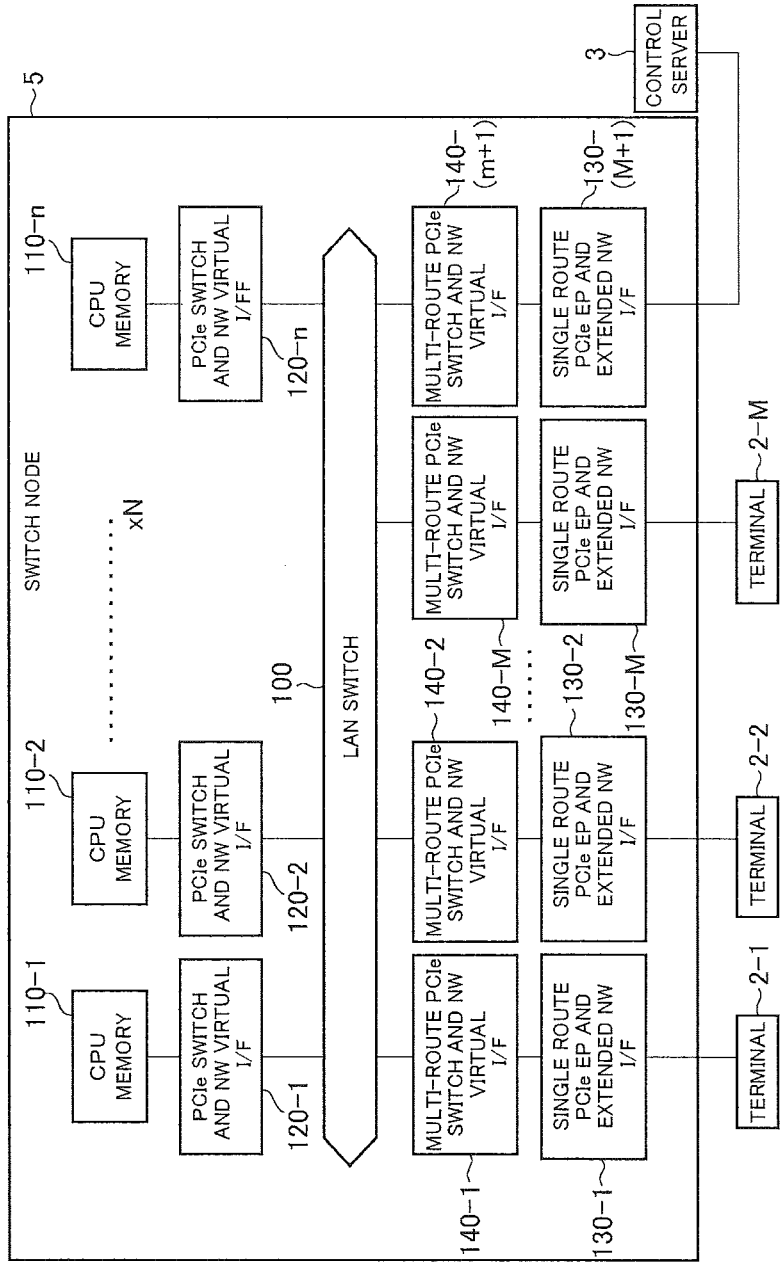
FIG. 14 is a diagram showing the communication control system according to a first exemplary embodiment of the present invention.

FIG. 14 shows a configuration example of the switch node according to a first exemplary embodiment.

The communication control system according to the present exemplary embodiment contains the terminals 2 (2-*i*, i=1 to T), the control server 3 and the switch node 5.

The terminals 2 (2-*i*, i=1 to T) and the control server 3 are the same as described previously.

The switch node 5 includes a LAN switch 100, a CPU and memory 110 (110-*y*, y=1 to N), a PCI express (PCIe) switch and network virtualizatian interface (NW virtualization I/F) 120 (120-*y*, y=1 to N), a single route PCI express endpoint (PCIe EP) and extended network interface (extended NW I/F) 130 (130-*x*, x=1 to (M+1)), and a multi-route PCI express (PCIe) switch and network virtualization interface (NW virtualization I/F) 140 (140-*x*, x=1 to (M+1)).

The LAN switch 100 is an Ethernet switch (Ethernet (registered trademark) switch), and connects the PCI express (PCIe) switch, the network virtualization interface (NW virtualization I/F) 120 (120-*y*, y=1 to N), and the single route PCI express endpoint (PCIe EP) and the extended network interface (extended NW I/F) 130 (130-*x*, x=1 to (M+1)).

The CPU and memory 110 (110-*y*, y=1 to N) is equivalent to a combination of the CPU 70 (70-*y*, y=1 to N) and the memory 80 (80-*y*, y=1 to N).

The PCI express (PCIe) switch and network virtualization interface (NW virtualization I/F) 120 (120-*y*, y=1 to N) is equivalent to a combination of the PCI express (PCIe) switch and the network virtualization interface (NW virtualization I/F). The PCI express (PCIe) switch and network imagination interface (NW virtualization I/F) 120 (120-*y*, y=1 to N) connects the LAN switch 100, and the CPU and memory 110 (110-*y*, y=1 to N).

The single route PCI express endpoint (PCIe EP) and extended network interface (extended NW I/F) 130 (130-*x*, x=1 to (M+1)) is equivalent to a combination of the single route PCI express endpoint (PCIe EP) and the extended network interface (extended NW I/F) 60 (60-*x*, x=1 to M). The single route PCI express endpoint (PCIe EP) and the extended network interface (extended NW I/F) 130 (130-*x*, x=1 to (M+1)) connects the terminal 2 (2-*i*, i=1 to T), the multi-route PCI express (PCIe) switch and the network virtualization interface (NW virtualization I/F) 140 (140-*x*, x=1 to (M+1)).

The multi-route PCI express (PCIe) switch and network virtualization interface (NW virtualization I/F) 140 (140-*x*, x=1 to (M+1)) is equivalent to a combination of the multi-route PCI express (PCIe) switch 50 and the network virtualization interface (NW virtualization I/F). The multi-route PCI express (PCIe) switch and network imagination interface (NW virtualization I/F) 140 (140-*x*, x=1 to (M+1)) connects the LAN switch 100, the single route PCI express endpoint (PCIe EP) and the extended network interface (extended NW I/F) 130 (130-*x*, x=1 to (M+1)).

In the present invention, as the number of CPUs increases, the improvement of the processing ability of the switch throughput can be expected.

If being one corresponding to the multi-route conforming PCI express (PCIe) switch on the "PCI-SIG" rule, it is available in the same way. The multi-route conforming switch is configured by using the LAN switch. The extended network interface (extended NW I/F) of the single route is virtualized to allow the plurality of CPUs to be accessible. Thus, the present invention can be applied to the system configuration which is equal to the multi-route configuration.

In this case, because the switch is configured on the LAN, a very large-scale virtual switch is configured. The CPU and a great deal of servers having memories and the network interface are connected to them, so that the switch node which is very large in scale and is highly functional can be configured.

[Second Exemplary Embodiment]

Figure 15:
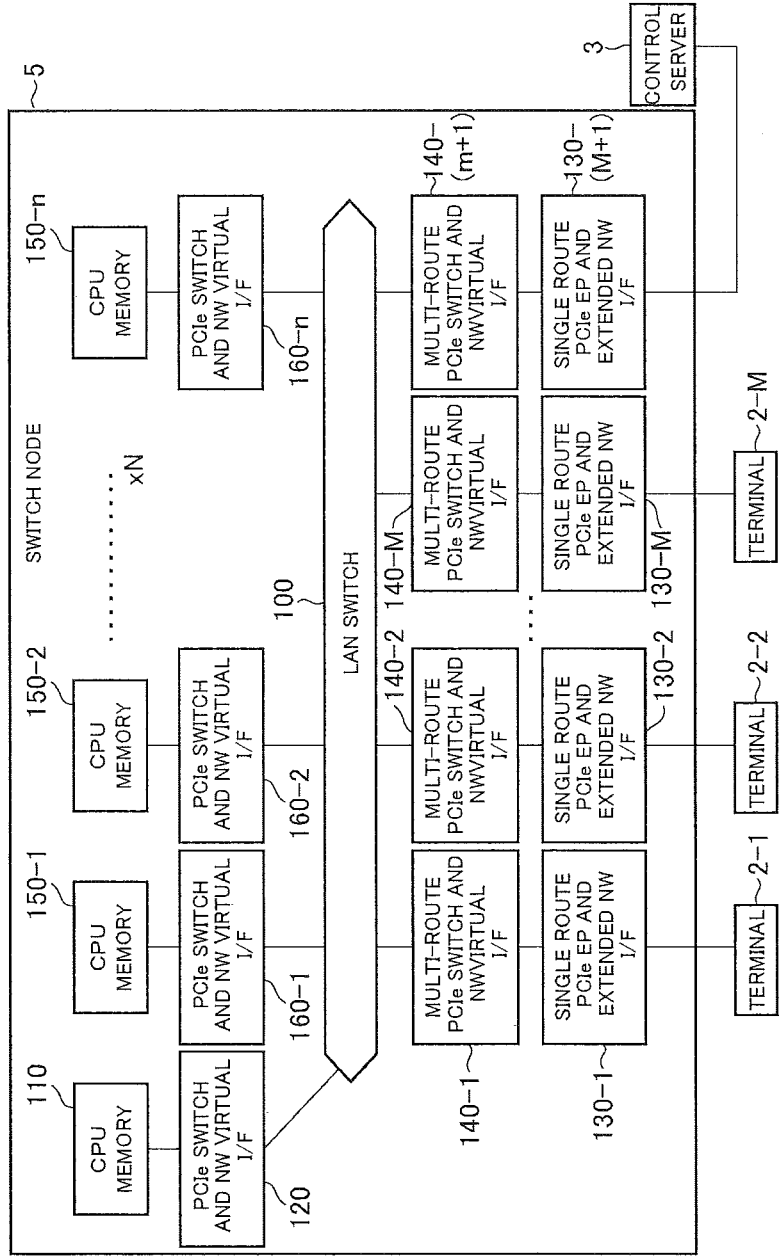
FIG. 15 is a diagram showing the communication control system according to a second exemplary embodiment of the present invention.

Also, FIG. 15 shows a configuration example of the switch node according to a second exemplary embodiment.

FIG. 15 is a configuration in which the CPU (70-*y*, y=1 to N) portion of FIG. 14 is changed into a GPU (Graphics Processing Unit) in which a great deal of processors are installed.

When using GPU, the packet processing may be carried out by the GPU instead of the CPU because the speeding-up of the packet processing can be expected and it is possible to connect to the PCI express (PCIe).

However, because the GPU is an I/O unit, one of the CPUs needs to be connected as a master CPU.

The communication control system according to the present exemplary embodiment contains the terminals 2 (2-*i*, i=1 to T), the control server 3 and the switch node 6.

The terminals 2 (2-*i*, i=1 to T) and the control server 3 are the same as described previously.

The switch node 6 includes the LAN switch 100, the CPU and memory 110, the PCI express (PCIe) switch and network virtualization interface (NW virtualization I/F) 120 (120-*y*, y=1 to N), the single route PCI express endpoint (PCIe EP) and extended network interface (extended NW I/F) 130 (130-*x*, x=1 to (M+1)), the multi-route PCI express (PCIe) switch and network virtualization interface (NW virtualization I/F) 140 (140-*x*, x=1 to (M+1)), a GPU and memory 150 (150-*y*, y=1 to N), and an express (PCI Express) switch and network virtualization interface (NW virtualization I/F) 120 (120-*y*, y=1 to N).

The LAN switch 100, the CPU and memory 110, the PCI express (PCIe) switch and network imagination interface (NW virtualization I/F) 120 (120-*y*, y=1 to N), the single route PCI express endpoint (PCIe EP) and extended network interface (Extension NW I/F) 130 (130-*x*, x=1 to (M+1)), and the multi-route PCI express (PCIe) switch and network virtualization interface (NW virtualization I/F) 140 (140-*x*, x=1 to (M+1)) are the same as in the first exemplary embodiment shown in FIG. 14.

The GPU and memory 150 (150-*y*, y=1 to N) is equivalent to a combination of the GPU and the memory 150 (150-*y*, y=1 to N).

The express (PCI Express) switch and network virtualization interface (NW virtualization I/F) 120 (120-*y*, y=1 to N) is equivalent to a combination of the express (PCI Express) switch and the network virtualization interface (NW virtualization I/F). The express (PCI Express) switch and network virtualization interface (NW virtualization I/F) 120 (120-*y*, y=1 to N) connects the LAN switch 100, and the GPU and memory 150 (150-*y*, y=1 to N).

SUMMARY

The present invention relates to a node which can utilize the multi-route PCI express (PCIe) switch prescribed in "the PCI-SIG", can manage a great deal of transfer tables, and can realizes high functional packet transfer processing, in the software-based network switch node.

The present invention can configure a large-capacity flow table, can carry out a high-speed packet switch processing, is connected with an external control server, and can realize high functional protocol processing by utilizing the multi-route compatible switch and the network interface which are prescribed in the PCI express (PCIe) in the software-based switch node.

The switch node according to the present invention is built in the software-base by using the multi-route PCI express (PCIe) switch, many CPUs and the many network interface cards.

The switch node according to the present invention carries out distribution of processing into the CPUs in the network interface in order to carry out the load distribution of the packets, and carries out the load distribution of the processing to the plurality of CPUs by using the multi-route PCI express (PCIe) switch.

The switch node according to the present invention carries out the synchronization of the transfer tables between the plurality of CPUs through the multi-route PCI express (PCIe) switch at high speed by using the extension interface card which is possible to carry out turning over.

REMARKS

As described above, the exemplary embodiments of the present invention have described in detail. However, actually, the present invention is not limited to the above-mentioned exemplary embodiments. A modification in the range which does not deviate from the scope of the present invention is contained in the present invention.

It should be noted that this application claims a priority based on Japanese Patent Application No. JP 2011-063441. The disclosure thereof is incorporated herein by reference.

The invention claimed is:

1. A communication control system, comprising:
a switch node configured to carry out processing of each of received packets based on a flow entry defining a rule and an action to uniformly control the packets; and
a control server configured to set the flow entry into a flow table of the switch node,
wherein the switch node comprises:
  means for connecting a plurality of processors including large-capacity memories and a plurality of extended network interfaces by a multi-route compatible Peripheral Component Interconnect (PCI) express switch, to configure switch ports including the plurality of extended network interfaces;
  means for carrying out load distribution transfer processing from the plurality of extended network interfaces to the plurality of processors and carrying out high-speed packet processing through multiple processing by using the plurality of processors;
  means for configuring a large-capacity flow table in the switch node which is software-based, by using a large-capacity memory space of the plurality of processors;
  means for receiving the packets by either of the plurality of extended network interfaces; and
  means for determining distribution processing to the plurality of processors by using a hash function in one of the plurality of extended network interfaces which receives the packets, and carrying out high-speed processing through the load distribution processing of software packet processing and multiple processing of the packet processing in the plurality of processors.

2. The communication control system according to claim 1, wherein the switch node further comprises:
means for distributing the packets to the plurality of processors by using a Direct Memory Access (DMA) controller of the extended network interface through the PCI express switch, and
wherein each of the plurality of processors comprises:
  means for analyzing the received packet with software processing;
  means for carrying out table search to the flow table which is configured by using a large-capacity memory provided for its own processor and managing destinations of a great deal of flows to determine a destination output port;
  means for controlling the DMA controller of one of the plurality of extended network interfaces which includes an output destination after the determination of the destination output port, and transferring the packets through the PCI express switch;
  means for transferring the packets to the control server through the extended network interface of the switch node, when the destination output port is not determined as a result of the table search of the flow table, and issues an inquiry of the output destination;
  means for storing destination data of a corresponding flow in the flow table when the destination output port is determined as a result of the inquiry; and
  means for carrying out synchronization processing of the flow tables among the plurality of processors, such that the flow tables managed by the plurality of processors store same data to allow the load distribution of the search processing.

3. The communication control system according to claim 1, wherein the switch node further comprises:
means for distributing the packets to the plurality of processors by using a Direct Memory Access (DMA) controller of the extended network interface through the PCI express switch.

4. The communication control system according to claim 3, wherein each of the plurality of processors comprises means for analyzing the received packet with software processing.

5. The communication control system according to claim 4, wherein said each of the plurality of processors further comprises means for carrying out table search to the flow table which is configured by using a large-capacity memory provided for its own processor and managing destinations of a great deal of flows to determine a destination output port.

6. The communication control system according to claim 5, wherein said each of the plurality of processors further comprises means for controlling the DMA controller of one of the plurality of extended network interfaces which includes an output destination after the determination of the destination output port, and transferring the packets through the PCI express switch.

7. The communication control system according to claim 6, wherein said each of the plurality of processors further comprises means for transferring the packets to the control server through the extended network interface of the switch node, when the destination output port is not determined as a result of the table search of the flow table, and issues an inquiry of the output destination.

8. The communication control system according to claim 7, wherein said each of the plurality of processors further comprises means for storing destination data of a corresponding flow in the flow table when the destination output port is determined as a result of the inquiry.

9. The communication control system according to claim 8, wherein said each of the plurality of processors further comprises means for carrying out synchronization processing of the flow tables among the plurality of processors.

10. A switch node, comprising:
a plurality of extended network interfaces configured to receive packets;
a plurality of processors including large-capacity memories; and
a multi-route compatible Peripheral Component Interconnect (PCI) express switch configured to connect the plurality of processors and the plurality of extended network interfaces,
wherein each of the plurality of extended network interfaces comprises:
   a Local Area Network (LAN) interface configured to carry out input and output of the packets;
   a packet transferring section configured to carry out at least one transfer processing of transfer processing of the packets to the plurality of processors, transfer processing of the packet between the plurality of processors, and transfer processing to a control server;
   a plurality of Page File (PF) resources configured to carry out transmission and reception of the packets at high speed with the plurality of processors by Direct Memory Access (DMA) transfer; and
   a PCI express endpoint connected with the PCI express switch, and
wherein each of the plurality of processors comprises:
   a network interface driver connected with the PCI express switch through a PCI express root complex to control one of the plurality of extended network interfaces;
   packet analyzing section configured to carry out analysis processing of the packets supplied from the extended network interface;
   a table searching section configured to search a flow table to determine the transfer processing of the packets based on the analysis result of the packets;
   a packet buffering section configured to inquire switch processing and processing undetermined packets to the control server and store the packet until a processing method is determined;
   a service inquiring section configured to inquire a content of the packet processing to the control server;
   an encrypting section configured to carry out encrypted communication with the control server;
   an extended network service setting section configured to set the flow table in response to an instruction from the control server and to carry out processing of the extended network service; and
   a multiprocessor transfer table synchronizing section configured to communicate the instruction from the control server to other processors and to carry out synchronization processing of the flow tables among the plurality of processors.

11. The switch node according to claim 10, wherein the packet transferring section further comprises:
   means for checking whether or not a destination Media Access Control (MAC) address of each of packets comprises a MAC address used by any of the processors in the switch node, when receiving the packets;
   means for transmitting, when the destination MAC address includes a MAC address used by any of the processors in the switch node, the packets to the PF resource by turning around without outputting the packet outside; and
   means for transmitting, when the destination MAC address is not the MAC addresses used by the processors, the packets to the control server through the LAN interface and inquiring a content of the packet processing to the control server, and transmitting a response packet from the control server to the PF resource.

12. A communication control method in a switch node which carries out processing of a received packet based on a flow entry which defines a rule and an action to uniformly control packets as a flow and which is set in its own flow table from a control server, the communication control method comprising:
   connecting a plurality of processors including large-capacity memories and a plurality of extended network interfaces by a multi-route compatible Peripheral Component Interconnect (PCI) express switch to configure switch ports including the plurality of extended network interfaces;
   carrying out load distribution transfer processing to the plurality of processors from the plurality of extended network interfaces, and carrying out high-speed packet processing through multiple processing by using the plurality of processors;
   configuring a large-capacity flow table in the switch node which is software-based, by using large-capacity memory spaces of the plurality of processors;
   receiving the packet by any of the plurality of extended network interfaces; and
   determining distribution processing to the plurality of processors by using a hash function in the extended network interface which has received the packet, and speeding up processing through the multiple processing of the packet processing and load distribution processing software packet processing in the processors.

13. The communication control method according to claim 12, further comprising:
   distributing the packets to the plurality of processors by using Direct Memory Access (DMA) controllers of the extended network interfaces through the PCI express switch;
   in each of the plurality of processors:
      analyzing the received packets in software processing;
      carrying out table search of the flow table which manages destinations of a great deal of flows and which is configured by using the large-capacity memories provided to the processors, to determine a destination output port;
      transferring the packets through the PCI express switch by controlling the DMA controller of the extended network interface as an output destination, after the determining of the destination output port;
      inquiring the output destination by transferring the packets to the control server through the extended network interface of the switch node, when the destination output port is not determined as a result of the table search of the flow table;
      storing destination data of the flow in the flow table when the destination output port is determined as a result of the inquiring; and
      carrying out synchronization processing of the flow table among the plurality of processors and storing same data in the flow tables managed by the plurality of processors to achieve the load distribution of search processing.

14. The communication control method according to claim 12, further comprising:
   distributing the packets to the plurality of processors by using Direct Memory Access (DMA) controllers of the extended network interfaces through the PCI express switch.

15. The communication control method according to claim 14, further comprising:
   in each of the plurality of processors:
      analyzing the received packets in software processing;
      carrying out table search of the flow table which manages destinations of a great deal of flows and which is configured by using the large-capacity memories provided to the processors, to determine a destination output port; and
      transferring the packets through the PCI express switch by controlling the DMA controller of the extended network interface as an output destination, after the determining of the destination output port.

16. The communication control method according to claim 15, further comprising:
   in said each of the plurality of processors:
      inquiring the output destination by transferring the packets to the control server through the extended network interface of the switch node, when the destination output port is not determined as a result of the table search of the flow table; and
      storing destination data of the flow in the flow table when the destination output port is determined as a result of the inquiring.

17. A recording medium which stores a program executed by a switch node in which a plurality of extended network interfaces which receive packets and a plurality of processors having large-capacity memories are connected through a multi-route compatible Peripheral Component Interconnect (PCI) express switch, and which carries out processing of a received packet based on a flow entry which defines a rule and an action to uniformly control packets as a flow and which is set in its own flow table from a control server,
   wherein the program comprises:
      extracting a header section of one of the packets when any of the plurality of extended network interfaces receives the packets from a terminal;
      carrying out hash processing in a flow unit by using at least one of a Media Access Control (MAC) address, a Virtual Local Area Network (VLAN) address, and an IP address, of data of the extracted header section;
      determining one of the processors as a distribution destination through the hash processing;
      transmitting the packets to a packet queue of a Page File (PF) resource corresponding to the distribution destination processor; and
      carrying out Direct Memory Access (DMA) transfer of the packets to the distribution destination processor based on a control of the distribution destination processor, and
   wherein the program further comprises:
      checking whether or not a destination Media Access Control (MAC) address of each of the packets is same as any of MAC addresses used by the processors in the switch node, when receiving the packets;
      transmitting the packets to the PF resource by turning around without outputting the packets outside, when the destination MAC address includes a MAC address used by any of the processors in the switch node; and
      transmitting the packets to the control server, when the destination MAC address is not any of the MAC addresses used by the processors in the switch node, and inquiring a processing content of the packets to the control server, to transmit a response packet from the control server to the PF resource.

18. The recording medium according to claim 17, wherein the program comprises:
   setting a flow table stored in a large-capacity memory provided for its own CPU in response to an entry addition request which is based on a service processing method which is determined by the control server; and
   writing the flow table into another CPU based on the setting of the flow table and carrying out synchronization processing of the flow tables among the plurality of processors.

* * * * *